United States Patent Office 3,515,093
Patented June 2, 1970

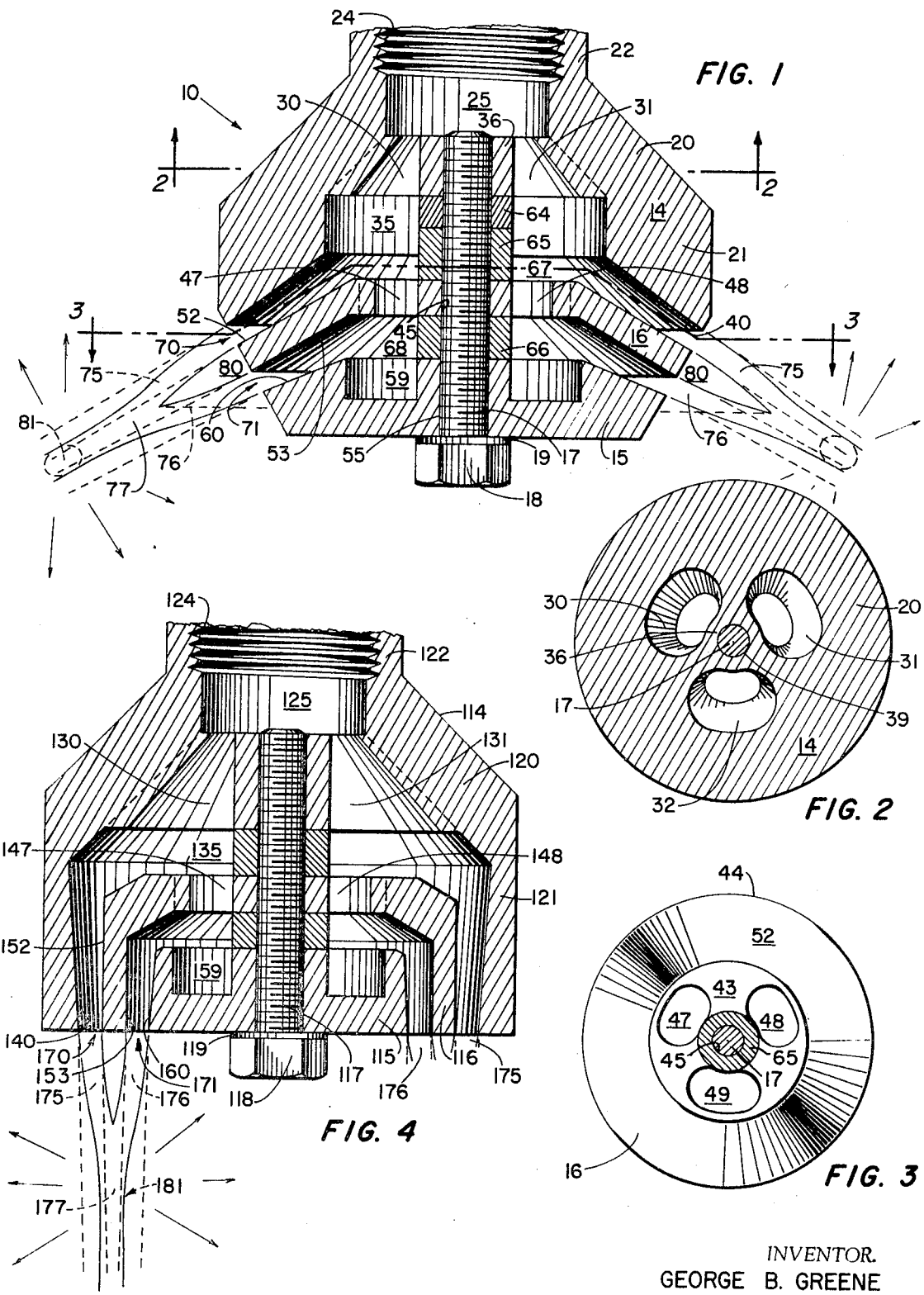

3,515,093
PRESSURE WAVE GENERATOR
George Boyd Greene, Newport Beach, Calif., assignor to Electronic Engineering Company of California, a corporation
Filed May 10, 1967, Ser. No. 637,593
Int. Cl. G10k 10/00
U.S. Cl. 116—137     3 Claims

ABSTRACT OF THE DISCLOSURE

Pressure wave producing apparatus having a plurality of orifices which are of elongated cross-section and are adapted, when supplied with fluid under pressure, to emit closely adjacent, sheet-like jets which interact in such a way as to continually alter each other's paths, and to produce sound waves in a fluid medium surrounding the apparatus. The sheet-like jets may take the form of closed, three-dimensional figures.

BACKGROUND OF THE INVENTION

This invention relates to improvements in pressure wave generators of the type in which a plurality of fluid jets interact in such manner as to substantially continually alter each other's paths, thereby producing pressure waves in the fluid medium through which the jets pass. More particularly, this invention relates to pressure wave generators of this type which, when immersed in a liquid medium, are capable of producing pressure gradients of sufficient intensity to result in cavitation of the medium.

In the art of testing the durability of electronic components and the like for use in high speed aircraft, it has been proposed to produce relatively low intensity pressure waves within a test chamber by the interaction of essentially one-dimensional jets of air, i.e., jets of air which are of substantially cylindrical cross-section closely adjacent their orifices and of length many times greater than the diameter of this cross-section. The area of interaction of such jets, while sufficient to produce pressure waves in air imparting enough energy for component testing purposes, is not sufficient to produce significant cavitation when a liquid medium is employed, nor is the employment of a liquid medium taught in this prior art proposal.

According to other proposals of the prior art, devices adapted for the production of pressure waves have employed one or more planar jets interacting with fixed structures such as knife edges or tuned resonators. Attempts to employ devices of this latter kind for the production of pressure waves of sufficient intensity to produce cavitation in a liquid medium have resulted in unsatisfactory service life, since said fixed structures were themselves exposed to the destructive effects of cavitation.

As is well-known to those skilled in the art, however, oil well drilling, completion, and clean-up, and many other applications require a pressure wave generator capable of producing pressure waves of a sufficiently high gradient to produce cavitation in a liquid medium adjacent the generator, while at the same time having extended service life.

SUMMARY OF THE INVENTION

To satisfy these requirements certain embodiments of the present invention employ sheet-like jets of liquid of extensive area which are closely juxtaposed outside, and only outside, the device, and which thus interact to produce pressure waves in a liquid medium outside the device, which in turn produce cavitation of the medium at locations remote from the device only. In preferred embodiments of the present invention these sheet-like jets take the form of approximately conical or cylindrical surfaces, or substantial portions thereof.

It is therefore an object of the present invention to provide a pressure wave generator of the interacting jet type capable of emitting waves of sufficiently high energy to produce cavitation in a liquid medium adjacent the generator.

Another object of the present invention is to provide a pressure wave generator capable of emitting pressure waves of sufficiently high intensity to produce cavitation in a liquid medium in which the generator is immersed without exposing the parts of the generator itself to such amounts of cavitation energy as will render its service life impractically short.

Other objects of the invention will in part be obvious, and will in part appear hereinafter.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWING

For a fuller understanding of the nature and objects of the invention, reference should be had to the following detailed description, taken in connection with the accompanying drawing, in which:

FIG. 1 is a central sectional view of a first embodiment of the present invention;

FIG. 2 is a sectional view of the embodiment of the present invention shown in FIG. 1, taken in plane 2—2;

FIG. 3 is a sectional view of the embodiment of the present invention shown in FIG. 1, taken along plane 3—3;

FIG. 4 is a central sectional view of a second embodiment of the present invention.

DESCRIPTION OF THE PREFERRED EMBODIMENTS

Referring now to FIGS. 1 through 3, which show a first embodiment of the present invention, the reference character 10 designates generally the body, or housing, thereof. Body 10 comprises an outer, generally cup-shaped shell member 14, a closure, or cap member, 15, and an intermediate member 16, all of which generally symmetrical about the axis of a central fastening member 17.

As may best be seen in FIG. 1, shell 14 generally comprises a central conical section 20 having an integral cylindrical flange 21 depending downward from its larger end, and an integral cylindrical flange 22 extending upward from its smaller end.

Flange 22 is equipped with an inner thread 24 by means of which shell 14, and thus body 10, may be fixed to the end of a supply conduit, such as the drill pipe of an oil drilling rig. Though the upper end of cylinder 22 is shown broken away for conveniece in FIG. 1, it is to be understood that flange 22 terminates at a sufficient distance above the upper end of conical central section 20 to assure a strong, leakproof joint between threads 24 and the corresponding external threads on said supply conduit. The length of cylindrical flange 22 may thus be determined by those having ordinary skill in the art. The particular means employed to join the interior of body 10 in substantially fluid-tight relationship to the end of said supply conduit comprises no part of the instant invention. Thus, cylindrical finge 22 might be externally threaded, and coact with an internally threaded supply conduit, or may employ any other joint occurring to those having ordinary skill in the art, all within the scope of the present invention.

The bore of flange 22 is extended into the upper end of central section 20 in the form of a cavity 25. Cavity 25 is generally cylindrical in cross-section and symmetrical about the axis of fastening member 17. The bore of flange 22 which is provided with threads 24 need not be of the same diameter as the diameter of cavity 25, and in some practical applications will not. In all cases, however, the inner bore of flange 22 will be in direct communication with cavity 25, so that fluids supplied to the device via the bore of flange 22 will pass directly into cavity 25.

As best seen by comparison of FIGS. 1 and 2, three passages 30, 31, 32 extend through the central portion of section 20 in a direction generally parallel to the axis of fastening member 17, which will hereinafter be also referred to as the axis of the device. Going to FIG. 1, it may be seen that these passages are larger in cross-section at their upper ends than at their lower ends, though such tapered construction of these passages is not a limitation of the present invention. Passages 30, 31, and 32 do, however, extend completely through the central portion of section 20 from cavity 25 to the similar cavity 35 which may be seen in FIG. 1 to be generally located within cylindrical flange 21. Cavity 35, like cavity 25, is symmetrical about the axis of the device in the illustrated embodiment. Since passages 30, 31, and 32 pass completely through the central portion of section 20, it may be seen in view of the above that cavity 35 is in direct, fluid passing communication with the bore of flange 22 by way of passages 30, 31 and 32 and cavity 25.

The lower end of cavity 35 is open, and thus a passage exists which extends completely through shell 14, and by way of which fluids may pass into the top end of shell 14, through the bore of flange 22, through passages 30, 31 and 32, through cavity 35, and thus out the bottom end of shell 14.

As may best be seen in FIG. 2, the web portions of section 20 which extend between passages 30, 31, and 32 support a central portion thereof which, though integral with the rest of section 20 in this embodiment, will be referred to herein as the hub, and designated by the reference numeral 36. Hub 36 is provided, in the present embodiment, with a central bore 39 which runs parallel to the axis of the device and is provided with threads adapted to coact with fastening member 17 to maintain shell 14 in operative juxtaposition to the other parts of the device.

As shown in FIG. 1, the lower end of flange 21 terminates in a face 40 which takes the form of a section of a cone the axis of which lies along the axis of the device. The cooperation of face 40 with a corresponding face of intermediate member 16 in carrying out the present invention will be described in detail hereinafter.

As may be seen by comparison of FIGS. 1 and 3, intermediate member 16 comprises an inner portion 43, and an outer portion 44 which is sometimes called herein the "skirt." Inner portion 43 is provided with a central bore 45 similar to bore 39 of shell 14 in that it is threaded in order to coact with fastening member 17 in maintaining the parts of the device in operative juxtaposition. Inner portion 43 of intermediate member 16 is also provided with three apertures 47, 48, and 49 passing completely through it from its upper face to its lower face. By means of these apertures fluids reaching cavity 35 from the bore of flange 22 may pass from the space between shell 14 and the upper side of intermediate member 16 to the lower side of intermediate member 16 to the lower side of intermediate member 16 during the operation of the device of the invention.

The outer skirt portion 44 of intermediate member 16 has an upper face 52 and a lower face 53. These two faces of outer skirt portion 44 both generally take the form of cones the axes of which lie on the axis of the device. The cooperation of these upper and lower faces 52 and 53 of intermediate member 16 with the other parts of the device in carrying out the invention will be described in detail hereinafter.

Cap member 15 is generally symmetrical about the axis of the device, and is provided with a central bore 55 which, like the central bores 39 and 45 of shell 14 and intermediate member 16, respectively, is provided with threads in order to coact with fastening member 17 to maintain the parts of the device in operative juxtaposition. The upper surface of cap member 15 may be provided with a generally toroidal cavity 59, though such a cavity is not a necessary limitation of the present invention. The outer portion of the upper surface of cap member 15 comprises a face 60 which takes the form of a section of a cone the axis of which lies along the axis of the device. The cooperation of face 60 with lower face 53 of intermediate member 16 in carrying out the invention will be described in detail hereinafter.

Having described in detail the three major parts 14, 15, and 16 of the device of the invention, their proper juxtaposition for carrying out the invention may be seen in FIG. 1. As explained above, parts 14, 15, and 16 are maintained in fixed, cooperating relationship by means of a fastening member 17. Fastening member 17 is provided with external threads with which the internal threads of the bores 39, 45, and 55 are interengaged.

Spacers 64, 65, and 66 are provided for the purpose of maintaining the major parts 14, 15, and 16 so interspaced as to carry out the invention. Spacers 64, 65 and 66 are of generally cylindrical shape, though this is not necessary to the carrying out of the invention, and are provided with central bores for passing over fastening member 17. The spacers may be internally threaded to interengage with the external threads of fastening member 17, though this is not a necessary part of the invention. Spacers 64 and 65 may be formed as a single unit within the scope of the invention.

Fastening member 17 may in some cases take the form of a bolt having a head 18 and an associated washer 19. Many other fastening means may be employed within the scope of the invention.

Referring now to the complete device of the present embodiment as shown in FIG. 1, it may be seen that the fluid supplied under pressure at flange 22 passes through the device as follows. The fluid flows from the bore of flange 22 into cavity 25. At the lower end of cavity 25 the fluid stream through the device becomes divided and passes through the three passages 30, 31 and 32 into cavity 35. Part of the fluid also passes through apertures 47, 48, and 49 into cavity 59 and the space above it. It will be apparent to those skilled in the art that in order for substantial amounts of fluid to reach cavity 59 the flow impedance of the gap between faces 40 and 52 must be considerably higher than the flow impedance of apertures 47, 48, and 49. Thus it may be seen that the major parts of the device, when maintained in proper interrelationship by fastening member 17, etc., define ducts whereby fluid under pressure may be supplied to the space between shell 14 and intermediate member 16, and the space between intermediate member 16 and cap member 15. These spaces are respectively termed the upper and lower supply chambers 67 and 68 herein.

As may be seen in FIG. 1, face 40 of shell 14 and face 52 of intermediate member 16 together define a generally conical orifice or nozzle 70 extending from upper supply chamber 67 to the exterior of the device of this embodiment. Similarly, lower face 53 of intermediate member 16 and face 60 of cap member 15 together define a generally conical orifice or nozzle 71 extending from lower supply chamber 68 to the exterior of the device of the invention. As may also be seen in FIG. 1, the apex angles of the cones corresponding to faces 40 and 52 are so chosen that orifice 70 has the same cross-sectional area at its inner and outer ends. Similarly, the apex angles of the cones corresponding to faces 53 and 60 are so chosen that orifice 71 has the same cross-sectional area at its inner and outer ends. As may still further be seen in FIG. 1, the apex angles of the cones corresponding to closed curvilinear faces or walls 40, 52, 53, and 60 are so chosen that the generally conical jets 75 and 76 issuing from orifices 70 and 71, would, if not acted upon by each other, be substantially parallel, i.e., remain the same distance apart. In some embodiments of the invention it may be desirable to so shape faces 40, 52, 53, and 60 as to cause jets 75 and 76 to slightly converge.

The form which would be taken by each one of the jets 75 and 76 absent the effect of the other is shown in dashed lines in FIG. 1. Due to the interaction between the two cone-like jets 75 and 76, however, the two will converge to form a single jet 77, all as shown in solid lines in FIG. 1. It must be understood, however, that the configuration of jet 77 as shown in FIG. 1 obtains at only one instant in time, since the interaction of jets 75 and 76 actually results in the constant change of the shape of jet 77 at so rapid a rate as to cause ultrasonic pressure waves to be propagated through the medium in which the device is immersed. These waves are propagated in directions approximately perpendicular to the means surface of conical jet 77, through a theoretical explanation of the operation of the device which more particularly points out the direction of propagation of the pressure wave is set out hereinafter. It will now be clear that the waves propagated in these directions (see arrows in FIG. 1) will not impinge directly on the device itself, and thus will not produce destructive cavitation at the surface of the device itself. On the other hand, the pressure waves propagated in the direction of said arrows can be made by proper positioning of the device of this embodiment to impinge on material surrounding or below the device, and will be of sufficient intensity to clean or erode such material, depending on the design of the device in accordance with the principles of the present invention.

It may be theorized that the device of the invention operates as a result of the entrapment of a relatively static, ring-like body of fluid 80 between jets 75 and 76 immediately outside the device. The two jets 75 and 76 will converge because the pressure of the fluid in space 80 is reduced by entrainment of fluid in jets 75 and 76 in the manner first described by Coanda. Thus the two jets 75 and 76 will merge into the single jet 77. Due to the presence of unavoidable disturbances, jet 77 will commence to oscillate, i.e., to successively grow larger and smaller in diameter. This oscillation of jet 77 will bring about the propagation of the above-mentioned pressure waves both outwardly and inwardly from the mean surface of jet 77, resulting in the cavitation in the surrounding fluid which produces the desired cleaning or eroding of adjacent work pieces, such as the walls of oil well bores. It may be additionally theorized that the pressure waves thus produced are propagated from a ring-shaper zone 81 located on the mean position of jet 77 at such a distance from the body of the device that the distance between the two extreme positions of the oscillating jet 77 is equal to the half wavelength corresponding to the fundamental frequency of the pressure wave.

It is to be understood, however, that the present invention is not limited to devices which can be said to operate in accordance with the above recited theory of operation.

In FIG. 4 there is shown an alternative embodiment of the invention in which the oscillating resultant jet is generally of cylindrical, rather than conical, configuration.

The parts of FIG. 4 are designated by reference numerals which are the reference numerals of the corresponding parts of the first embodiment (FIGS. 1 through 3) with 100 arbitrarily added thereto. Thus part 114 of FIG. 4 generally corresponds to shell 14 shown in FIGS. 1 and 2, and the part designated 117 in FIG. 4 generally corresponds to fastening member 17 of the first embodiment, etc.

It will thus be seen that the objects set forth above, among those made apparent from the preceding description are efficiently obtained, and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described by invention, what I claim as new and desire to secure by Letters Patent is:

1. A pressure wave generator, comprising: body means; pressure fluid duct means within said body means; and a plurality of aperture of aperture means extending from said duct means to the space outside said body means and each of the aperture means defined by wall means lying on surfaces of revolution having a common axis, the opening of said aperture means being adjacent each other and the aperture means being so located and configured that the jets which issue therefrom when fluid under pressure is supplied to said duct means issue in the form of generally parallel sheets which merge into a resultant jet which continually changes its shape, thereby producing pressure waves in a fluid medium in said space outside said body means.

2. A pressure wave generator as claimed in claim 1 in which said wall means take the form of closed curves.

3. A pressure wave generator as claimed in claim 1 in which said aperture means are so located and configured that the jets which issue therefrom when fluid under pressure is supplied to said duct means issue in the form of converging sheets.

References Cited

UNITED STATES PATENTS

| 3,169,509 | 2/1965 | Rich | 137—81.5 X |
| 2,437,456 | 3/1948 | Bodine. | |
| 3,070,313 | 12/1962 | Fortman. | |
| 2,559,864 | 7/1951 | Firth. | |
| 3,206,397 | 9/1965 | Harvey | 134—1 X |
| 3,107,647 | 10/1963 | Soloff. | |
| 3,081,946 | 3/1963 | Soloff | 259—1 X |

FOREIGN PATENTS 1,449,728  7/1966  France.

OTHER REFERENCES

IBM Technical Disclosure Bulletin, vol. 6, No. 5, October 1963, "Two Jet Logic Using Walls" by A. E. Mitchell.

LOUIS R. PRINCE, Primary Examiner

D. M. YASICH, Assistant Examiner

U.S. Cl. X.R.

137—81.5; 181—.5